US012578939B2

(12) United States Patent
Sundaresan et al.

(10) Patent No.: US 12,578,939 B2
(45) Date of Patent: Mar. 17, 2026

(54) SPLIT-SCALARIZATION OF THREAD-LOCAL OBJECTS IN OPTIMIZED OBJECT CODE

(71) Applicants: INTERNATIONAL BUSINESS MACHINES CORPORATION, Armonk, NY (US); INDIAN INSTITUTE OF TECHNOLOGY MADRAS (IIT MADRAS), Chennai (IN)

(72) Inventors: Vijay Sundaresan, North York (CA); Daryl James Maier, Canada (CA); Krishna Nandivada Venkata, Chennai (IN); Manas Thakur, Mumbai (IN)

(73) Assignees: INTERNATIONAL BUSINESS MACHINES CORPORATION, Armonk, NY (US); INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 198 days.

(21) Appl. No.: 18/464,636

(22) Filed: Sep. 11, 2023

(65) Prior Publication Data

US 2025/0085938 A1     Mar. 13, 2025

(51) Int. Cl.
*G06F 8/41* (2018.01)
*G06F 8/30* (2018.01)

(52) U.S. Cl.
CPC ............... *G06F 8/41* (2013.01); *G06F 8/315* (2013.01)

(58) Field of Classification Search
CPC .................................... G06F 8/41; G06F 8/315
USPC .................................... 717/140–153, 140–53
See application file for complete search history.

(56) References Cited

U.S. PATENT DOCUMENTS

| | | | | | |
|---|---|---|---|---|---|
| 5,175,856 | A | * | 12/1992 | Van Dyke ............... | G06F 8/445 |
| | | | | | 717/124 |
| 5,740,443 | A | * | 4/1998 | Carini ................... | G06F 8/4441 |
| | | | | | 717/133 |
| 6,045,585 | A | * | 4/2000 | Blainey .................... | G06F 8/41 |
| | | | | | 717/156 |
| 6,151,704 | A | * | 11/2000 | Radigan .................. | G06F 8/443 |
| | | | | | 717/160 |

(Continued)

OTHER PUBLICATIONS

Davidson et al, "Code Selection through Object Code Optimization", ACM, pp. 1-22 (Year: 1984).*

(Continued)

*Primary Examiner* — Anil Khatri
(74) *Attorney, Agent, or Firm* — Seed Intellectual Property Law Group LLP

(57) ABSTRACT

Aspects of the present disclosure relate to split-scalarization of thread-local objects in optimized object code. A computer-implemented method includes receiving source code including a programmed method and a reference within the programmed method that accesses a field of an object. Then, the method includes determining that the field of the object is scalarizable over a region of the programmed method and performing scalarization of the field of the object over the region of the programmed method. Finally, the method includes outputting optimized object code with the field of the object scalarized over the region of the programmed method and with another field of the object unscalarized in a different region of the programmed method.

20 Claims, 4 Drawing Sheets

(56)                  References Cited

U.S. PATENT DOCUMENTS

| | | | |
|---|---|---|---|
| 7,373,641 | B2 | 5/2008 | Ogasawara |
| 7,996,825 | B2 * | 8/2011 | Chakrabarti .......... G06F 8/4441 |
| | | | 717/140 |
| 8,418,160 | B2 | 4/2013 | Doyle |
| 8,789,032 | B1 * | 7/2014 | Li ............................ G06F 8/30 |
| | | | 717/154 |
| 9,134,975 | B1 * | 9/2015 | Beavin ...................... G06F 8/65 |
| 10,528,587 | B2 * | 1/2020 | Kim ................... G06F 16/2453 |
| 10,599,404 | B1 * | 3/2020 | Neto ......................... G06F 8/40 |
| 11,409,508 | B1 * | 8/2022 | Toub ....................... G06F 8/656 |
| 2011/0302559 | A1 | 12/2011 | Naik |
| 2013/0305021 | A1 | 11/2013 | Grover et al. |

OTHER PUBLICATIONS

Fan et al, "Postiz: Extending Post-increment Addressing for Loop Optimization and Code Size Reduction", ACM, pp. 1-14 (Year: 2025).*

Flückiger et al, "Sampling Optimized Code for Type Feedback", ACM, pp. 1-13 (Year: 2020).*

Villalobos et al, "A New Multi-Objective Evolutionary Algorithm Based on a Performance Assessment Indicator", ACM, pp. 1-8 (Year: 2012).*

Stadler et al., "Partial Escape Analysis and Scalar Replacement for Java", https://ssw.jku.at/Teaching/PhDTheses/Stadler/Thesis_Stadler_14.pdf, Faculty of Engineering and Natural Sciences, May 2014, 130 pages.

Lucas et al., "Spatiotemporal SIMT and Scalarization for Improving GPU Efficiency", https://dl.acm.org/doi/10.1145/2811402, ACM Trans. Archit. Code Optim. 12, 3, Article 32, Sep. 2015, 26 Pages.

Harrington et al., "Using Escape Analysis in Dynamic Data Race Detection", http://www.cs.williams.edu/~freund/papers/14-escape-analysis-tr.pdf, Williams College Technical Report CSTR201401, Accessed Jun. 21, 2023, 3 pages.

Bruno Blanchet, Escape analysis: correctness proof, implementation and experimental results, In Proceedings of the 25th ACM SIGPLAN-SIGACT symposium on Principles of programming languages, pp. 25-37, 1998, 13 pages.

Jong-Deok Choi et al., "Stack allocation and synchronization optimizations for Java using escape analysis", ACM Transactions on Programming Languages and Systems, 25:876-910, 2003, IBM, Research Report, 52 pages.

Steven S. Muchnick, "Advanced Compiler Design and Implementation", Morgan Kaufmann, 1997, 6 pages.

Manas Thakur et al., "PYE: A Framework for Precise-Yet-Efficient Just-In-Time Analyses for Java Programs", ACM Trans. Program. Lang. Syst., 41:16:1-16:37, 2019, 37 pages.

John Whaley et al., "Compositional pointer and escape analysis for Java programs", In Proceedings of the 14th ACM SIGPLAN conference on Object-oriented programming, systems, languages, and applications, pp. 187-206, 1999, 20 pages.

* cited by examiner

100

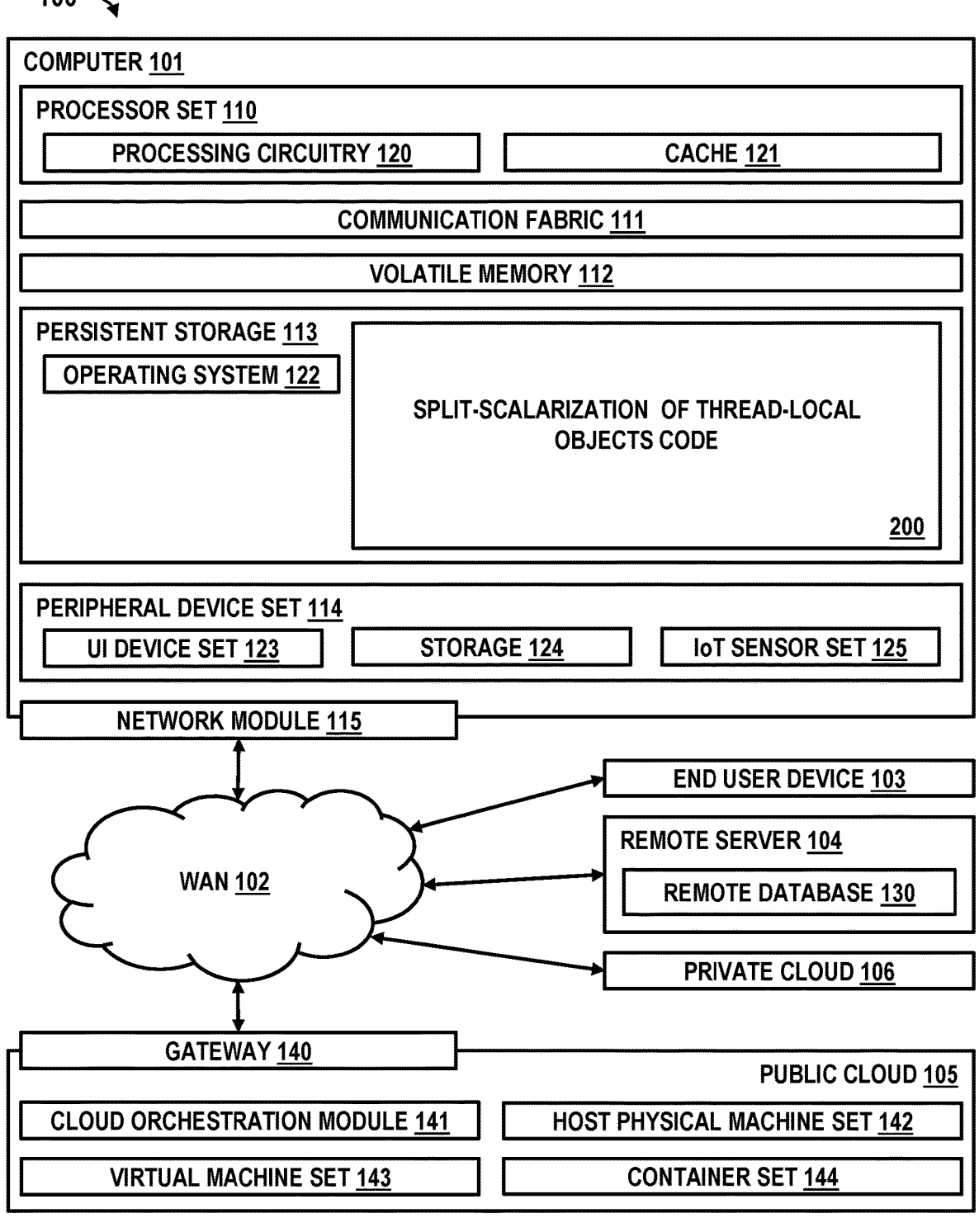

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

SPLIT-SCALARIZATION OF THREAD-LOCAL OBJECTS CODE

200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

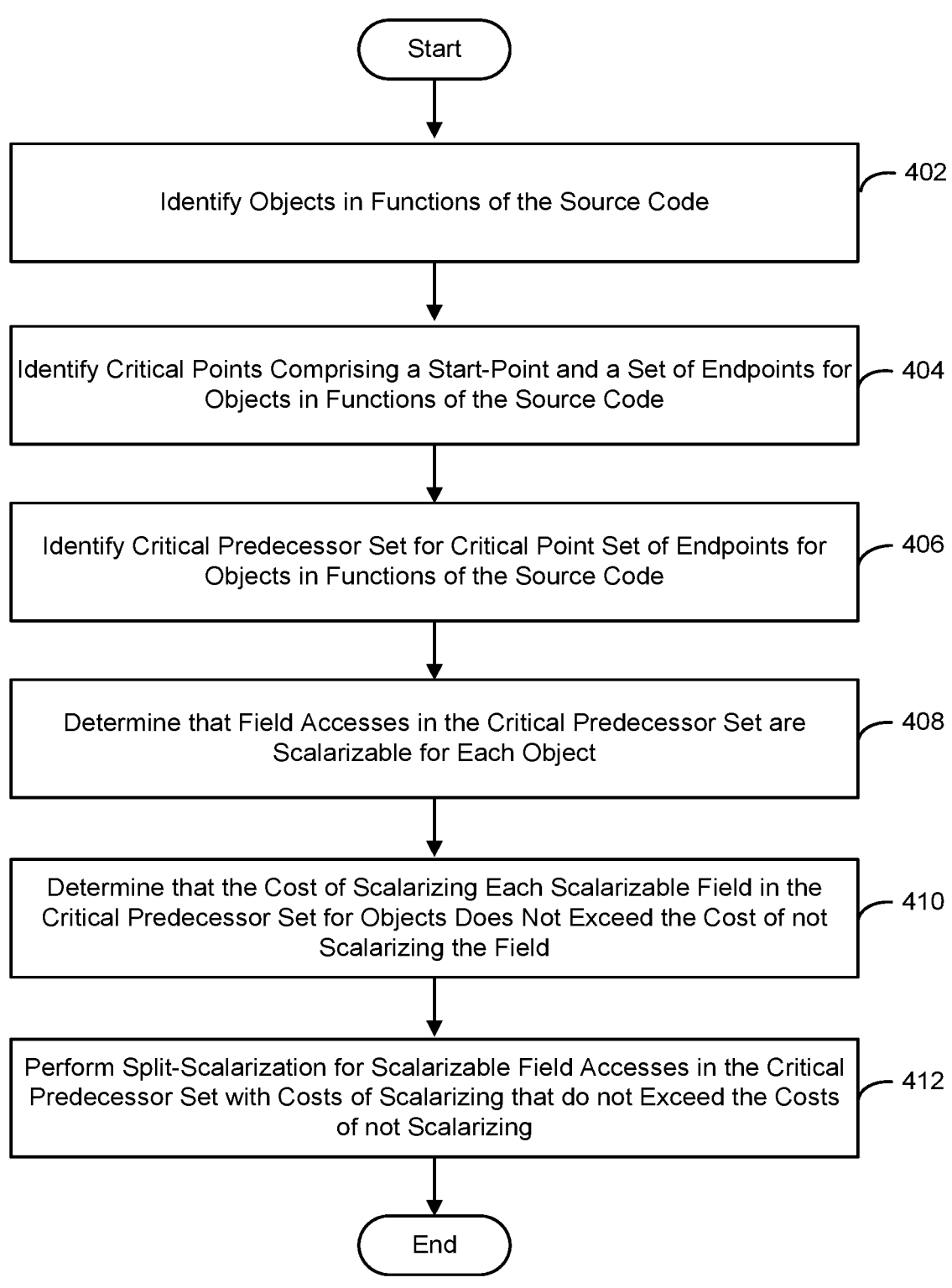

Start

Identify Objects in Functions of the Source Code — 402

Identify Critical Points Comprising a Start-Point and a Set of Endpoints for Objects in Functions of the Source Code — 404

Identify Critical Predecessor Set for Critical Point Set of Endpoints for Objects in Functions of the Source Code — 406

Determine that Field Accesses in the Critical Predecessor Set are Scalarizable for Each Object — 408

Determine that the Cost of Scalarizing Each Scalarizable Field in the Critical Predecessor Set for Objects Does Not Exceed the Cost of not Scalarizing the Field — 410

Perform Split-Scalarization for Scalarizable Field Accesses in the Critical Predecessor Set with Costs of Scalarizing that do not Exceed the Costs of not Scalarizing — 412

End

FIG. 4

SPLIT-SCALARIZATION OF THREAD-LOCAL OBJECTS IN OPTIMIZED OBJECT CODE

BACKGROUND

Aspects of the present invention relate generally to optimization of object code and, more particularly, to systems, computer program products, and methods of scalarization in optimized object code.

Depending upon the programming language, source code is typically compiled by a compiler either into object code which is machine code or native binary code for execution by a CPU or into bytecode that is interpreted at run time to produce machine code executed by the CPU. In static compilation, static compilers may generate intermediate code that is translated into object code ahead of time for execution on a specific CPU architecture. Many programming language such as C and C++, for example, are usually compiled ahead of time using static compilers. Other programming languages such as Java™, for example, are compiled into bytecode and use dynamic compilation, including just-in-time compilation. Still other programming languages such as C# and Python™, for example, may use a combination of static compilation and dynamic compilation.

Optimizing compilers generate intermediate code from the source code and translate the intermediate code into an optimized version to improve resource consumption such as CPU and memory usage and machine code execution time while ensuring equivalent semantic results as the unoptimized intermediate code. There are many types of optimizations by compilers such as inlining, optimizing stack allocation, and eliminating synchronization operations for improving machine code execution time and memory usage, to name a few. For example, inlining replaces certain function calls with the actual code of the function to eliminate the overhead of the function call and expose the entire function to the caller to enable the compiler to better optimize the function code. Stack allocation optimization, on the other hand, focuses on garbage free memory allocation on a stack. Optimizations for eliminating synchronization operations aim to eliminate atomic operations required to implement object monitor synchronization primitives.

SUMMARY

In a first aspect of the invention, there is a computer-implemented method including: receiving, by a processor set, source code including at least one programmed method and at least one reference within the at least one programmed method that accesses at least one field of at least one object; determining, by the processor set, that the at least one field of the at least one object is scalarizable over a region of the at least one programmed method; performing, by the processor set, scalarization of the at least one field of the at least one object over the region of the at least one programmed method; and outputting, by the processor set, optimized object code with the at least one field of the at least one object scalarized over the region of the at least one programmed method and with another field of the at least one object unscalarized in a different region of the at least one programmed method.

In another aspect of the invention, there is a computer program product including one or more computer readable storage media having program instructions collectively stored on the one or more computer readable storage media. The program instructions are executable to: receive source code including at least one programmed method and at least one reference within the at least one programmed method that accesses at least one field of at least one object; identify critical points comprising a start-point and a set of endpoints for the at least one object within the at least one programmed method; identify a critical predecessor set for the set of endpoints of the critical points of the at least one object within the at least one programmed method; determine that at least one field access of the at least one object in the critical predecessor set of the at least one programmed method is scalarizable; perform scalarization of the at least one field access of the at least one object in the critical predecessor set of the at least one programmed method; and output optimized object code with the at least one field access of the at least one object scalarized in the critical predecessor set of the at least one programmed method and with another field access of the at least one object not scalarized that is not in the critical predecessor set in the at least one programmed method.

In another aspect of the invention, there is system including a processor set, one or more computer readable storage media, and program instructions collectively stored on the one or more computer readable storage media. The program instructions are executable to: receive source code including at least one programmed method and at least one reference within the at least one programmed method that accesses at least one field of at least one object; determine that the at least one field of the at least one object is scalarizable over a region of the at least one programmed method; determine that a cost of scalarizing the at least one field of the at least one object does not exceed a cost of not scalarizing the at least one field; perform scalarization of the at least one field of the at least one object over the region of the at least one programmed method; and output optimized object code with the at least one field of the at least one object scalarized over the region of the at least one programmed method and with another field of the at least one object unscalarized in a different region of the at least one programmed method.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 4 shows a flowchart of an exemplary method in accordance with aspects of the present invention.

DETAILED DESCRIPTION

Figure 2:
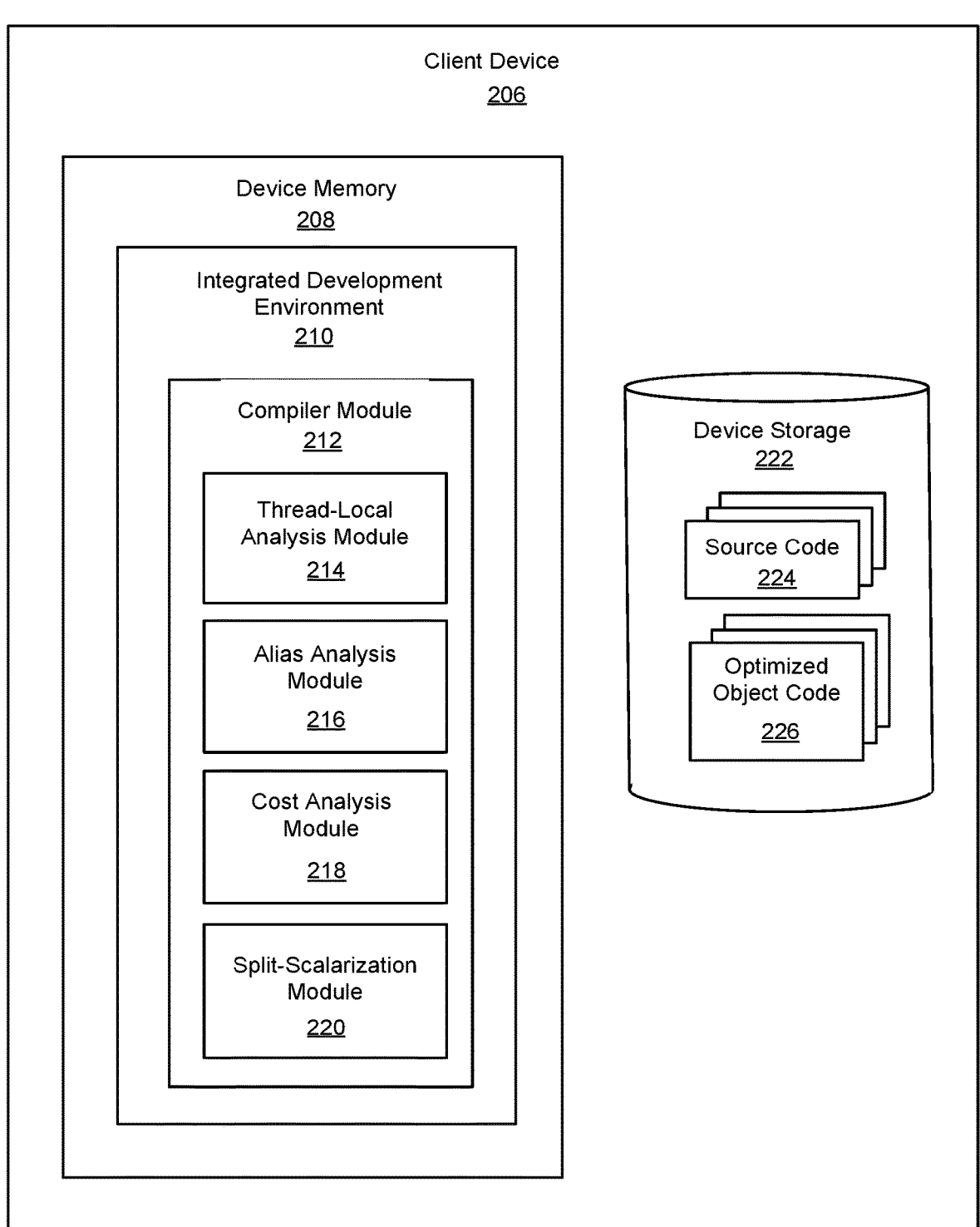
FIG. 2 shows a block diagram of an exemplary environment in accordance with aspects of the present invention.

Aspects of the present invention relate generally to optimization of object code and, more particularly, to systems, computer program products, and methods of split-scalarization of thread-local objects in optimized object code. More specifically, aspects of the present invention relate to methods, computer program products, and systems for receiving source code including programmed methods and references within the programmed methods that access fields of an object, determining that one or more fields of the object are scalarizable over a region of the programmed method, and performing scalarization of the one or more fields of the object over the region of the programmed method. The methods, systems, and computer program products of the present invention also determine fields of the object that are not scalarizable in a different region of the programmed method and output optimized object code with the one or more fields of the object scalarized over the region of the programmed method and with one or more other fields of the object unscalarized in the different region of the programmed method.

Embodiments of the present disclosure recognize the need for improvements in scalar-replacement for object-oriented languages like Java™ that pay a significant performance penalty in dereferencing objects, managing memory overheads and garbage collection overheads. Scalar-replacement (or scalarization) has traditionally been carried out only for method-local objects that are guaranteed to remain local to a method. In this case, all the fields of a method-local object can be scalarized and directly allocated on the stack. Unfortunately, performing scalarization only for method-local objects severely limits the application of scalarization in object-oriented languages because it is quite common for objects to be passed and returned from other functions. Aspects of the present invention overcome the limitations of performing scalarization only for method-local objects by performing split-scalarization for thread-local objects that are guaranteed to remain local to a thread and scalarizing field access of objects over regions of a function, thereby improving the performance by reducing the overhead due to heap access. Embodiments of the present invention may scalarize fields of an object that: (i) are created in the function, (ii) are received as arguments, (iii) are sent out as arguments to another called method, or (iv) may get modified in the function. According to aspects of the present invention, the methods, systems, and computer program products described herein output optimized object code with the one or more fields of the object scalarized over a region of the method and with one or more other fields of the object unscalarized in a different region of the method.

In embodiments, the methods, systems, and computer program products described herein identify critical points comprising a start-point and a set of endpoints for an object within a programmed method and identify a critical predecessor set for the set of endpoints of the critical points of the object. The methods, systems, and computer program products of the present disclosure determine scalarizable field accesses of the object in the critical predecessor set of the programmed method, perform scalarization of the field accesses of the object in the critical predecessor set, and output optimized object code with the field accesses of the object scalarized in the critical predecessor set of the programmed method and with other field accesses of the object not scalarized that are not in the critical predecessor set in the programmed method.

Advantageously, the methods, computer program products, and systems of the present invention perform split-scalarization of thread-local objects using thread-local analysis that includes thread-escape analysis to identify thread-local objects, using alias analysis to identify objects pointed to by local variables whose points-to sets are singleton sets, performing cost analysis on the singleton sets that identifies beneficial objects for which split-scalarization is cost-effective, and performing the split-scalarization operation on the beneficial objects to optimize object code by scalarizing field access of objects over regions of a function.

Aspects of the present invention are directed to improvements in computer-related technology and existing technological processes for scalar-replacement in object-oriented languages, among other features as described herein. In embodiments, the methods, computer program products, and systems may receive source code including programmed methods and references within the programmed methods that access fields of an object, determine that one or more fields of the object are scalarizable over a region of the programmed method, and perform scalarization of the one or more fields of the object over the region of the programmed method. The methods, systems, and computer program products of the present disclosure also determine fields of the object that are not scalarizable in a different region of the programmed method and output optimized object code with the one or more fields of the object scalarized over the region of the programmed method and with one or more other fields of the object unscalarized in the different region of the programmed method. Advantageously, the methods, computer program products, and systems described herein perform split-scalarization of thread-local objects in optimized object code by scalarizing field access of objects over regions of a programmed method, thereby improving the performance by reducing overheads due to heap access. These are specific improvements in existing technological processes for scalar-replacement in object-oriented languages.

Implementations of the disclosure describe additional elements that are specific improvements in the way computers may operate and these additional elements provide non-abstract improvements to computer functionality and capabilities. As an example, the methods, computer program products, and systems describe a compiler module, thread-local analysis module, alias analysis module, cost analysis module and split-scalarization module that receive source code including programmed methods and references within the programmed methods that access fields of an object, determine that one or more fields of the object are scalarizable over a region of the programmed method, perform scalarization of the one or more fields of the object over the region of the programmed method, determine fields of the object that are not scalarizable in a different region of the programmed method, and output optimized object code with the one or more fields of the object scalarized over the region of the programmed method and with one or more other fields of the object unscalarized in the different region of the programmed method. The additional elements of the methods, computer program products, and systems of the present disclosure are specific improvements in the way computers may operate to for scalar-replacement in object-oriented languages.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as split-scalarization of thread-local objects code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the present invention. In embodiments, the environment 205 may be a computing environment such as computing environment 100 described with respect to FIG. 1 and includes a client device 206 which may be a computer system such as computer 101, described with respect to FIG. 1. In general, client device 206 runs an integrated development environment 210 used by developers to write and compile source code for execution by environment 205.

Client device 206 has device memory 208 such as volatile memory 112 described with respect to FIG. 1. Client device 206 includes, in device memory 208, integrated development environment (IDE) 210 having software development tools with functionality to support software development by a software developer writing source code 224 in a programming language and compiling the source code 224 into optimized object code 226. The integrated development environment 210 may generate source code such as source code 224 which may be any programming language source code including Java™, JavaScript™, Python™, Node JS™, Golang™, C, C++, C#, or other programming languages. For example, a software developer may use the IDE 210 to write Java™ code or JavaScript™ or other programming source code for applications such as a serverless function, a microservice, a gateway API, and/or other applications deployed in environment 205.

Among other software development tools for a software developer, integrated development environment 210 includes compiler module 212 having functionality to compile source code 224 into optimized object code 226. Compiler module 212 includes thread-local analysis module 214 having functionality in embodiments to perform escape analysis to determine the scope of object references in source code methods and identify objects in source code methods which are thread-local objects with references to the object that do not escape to any other thread but remain local to the thread without references to the object outside the thread. Compiler module 212 also includes alias analysis module 216 having functionality to identify objects in source code methods in embodiments that are referenced by local variables (or fields) whose points-to sets are singleton sets, such that each of the objects identified have local variable references that only reference the memory location of that respective object. Compiler module 212 further includes cost analysis module 218 having functionality to identify objects in embodiments for which split-scalarization is cost-effective. For example, objects may be identified having unscalarized costs for accessing fields that exceed the split-scalarization costs for accessing fields in embodiments. Compiler module 212 additionally includes split-scalarization module 220 having functionality to perform split-scalarization to scalarize object fields accessed over a region or parts of a method or function, among other functionality. For example, to preserve semantic functionality in translation of the source code, an instruction is added in embodiments to copy an object field to a scalar before such a region and a similar instruction to copy the scalar back to the field at the end of the region, if the field may be accessed beyond that point.

In embodiments, integrated development environment 210, compiler module 212, thread-local analysis module 214, alias analysis module 216, cost analysis module 218 and split-scalarization module 220, each may include routines, programs, objects, components, logic, data structures, and so on that perform particular tasks or implement particular data types used to carry out the functions and/or methodologies of embodiments of the invention as described herein. These modules are executable by the processing circuitry to perform the inventive methods as described herein. Client device 206 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the present invention, FIG. 2 also shows a block diagram of device storage 222 which may be storage such as storage 124 of computer 101 described with respect to FIG. 1. Device storage 222 may store source code 224 in files and optimized object code 226 in files. The source code 224 is generated by IDE 210 and may be any programming language source code including Java™, JavaScript™, Python™, Node JS™, Golang™, C, C++, C#, or other programming languages. The optimized object code 226 is generated by compiler module 212 with split-scalarization of objects performed for objects that are cost effective. Depending upon the programming language of the source code, the optimized object code 226 may be machine code or native binary code for execution by a CPU or bytecode that is interpreted at run time to produce machine code executed by the CPU. For example, the optimized object code for programming language such as C and C++ may be machine code or native binary code for execution by a CPU. For other programming languages such as Java™, for instance, the optimized object code may be bytecode that is interpreted at run time to produce machine code executed by the CPU.

Figure 3:
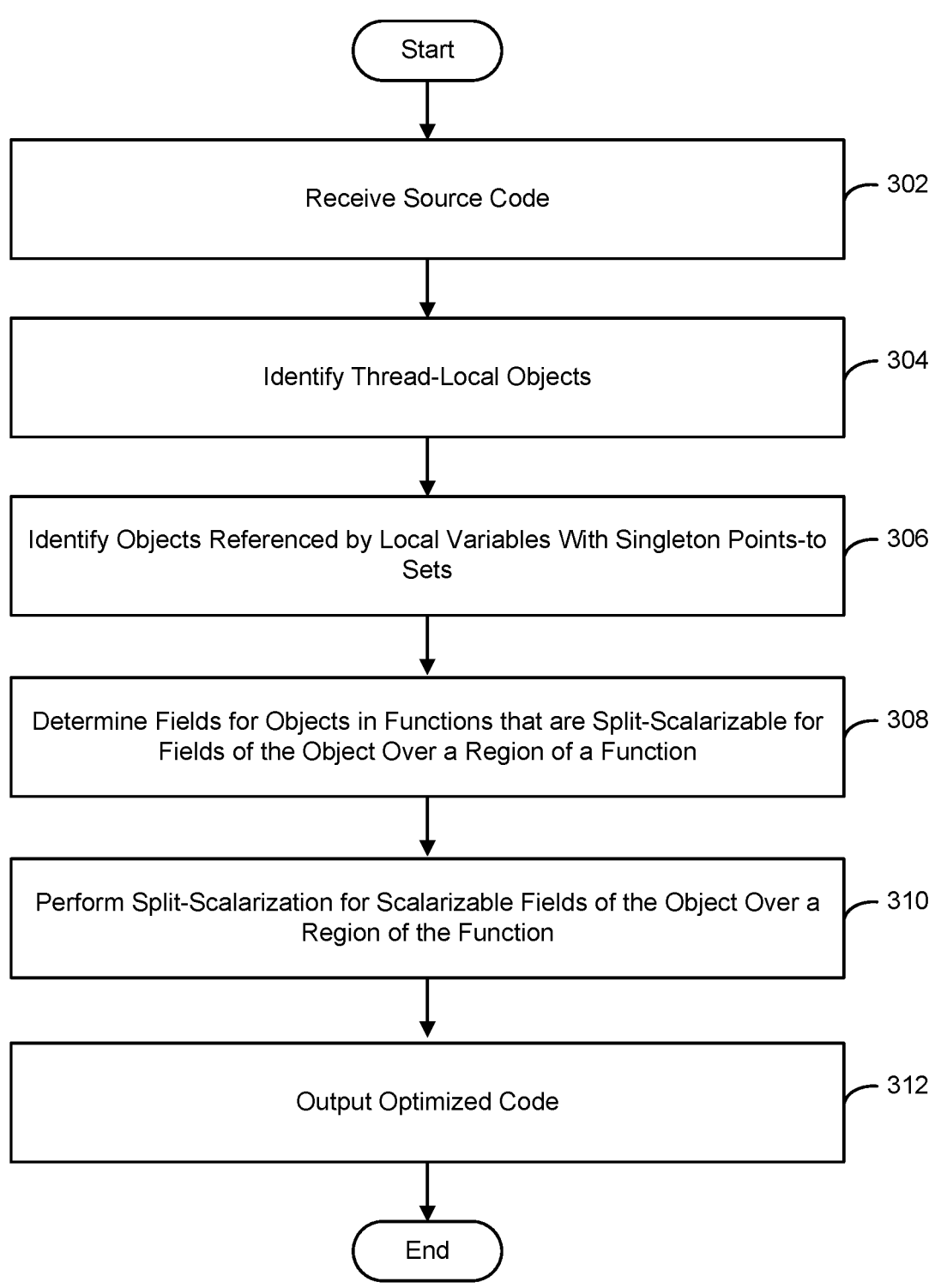
FIG. 3 shows a flowchart of an exemplary method in accordance with aspects of the present invention.

FIGS. 3-4 show flowcharts and/or block diagrams that illustrate the architecture, functionality, and operation of possible implementations of systems, methods, and computer program products according to various embodiments of the present invention. As noted above with respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time. And some blocks shown may be performed and other blocks not performed, depending upon the functionality involved.

FIG. 3 shows a flowchart of an exemplary method in accordance with aspects of the present invention. Steps of the method may be carried out in the environment of FIG.

2 and are described with reference to elements depicted in FIG. 2. In particular, the flowchart of FIG. 3 shows an exemplary method for optimizing object code compiled from source code by split-scalarization to scalarize some fields of the object over parts of a method or function, in accordance with aspects of the present invention.

At step 302, the system receives source code for compilation. The source code may be any programming language source code including Java™, JavaScript™, Python™, Node JS™, Golang™, C, C++, C#, or other programming languages. For example, as described with respect to FIG. 2, a software developer may use IDE 210 to write Java™ code or JavaScript™ or other programming source code for applications deployed in environment 205 and the IDE 210 may generate source code input to compiler module 212 for compilation of optimized object code 226. In embodiments, and as described with respect to FIG. 2, the compiler module 212 receives source code 224 for compilation. In embodiments, the source code 224 source code includes at least one programmed method and at least one reference within the at least one programmed method that accesses at least one field of at least one object. In embodiments, a programmed method includes a method programmed in the source code, such as a method that can be called or invoked, for example.

At step 304, the system identifies thread-local objects in source code. For instance, as described with respect to FIG. 2, thread-local analysis module 214 performs escape analysis to determine the scope of object references in source code methods in embodiments and identifies objects in source code methods which are thread-local objects. A thread-local object is an object that has references to the object that do not escape to any other thread but remains local to the thread without references to the object outside the thread. For example, an object created in a thread, using a factory method, is considered thread-local, if the object is not accessed in another thread as identified by inter-procedural escape/points-to information. In embodiments, and as described with respect to FIG. 2, thread-local analysis module 214 identifies thread-local objects in source code.

At step 306, the system identifies objects referenced by local variables with singleton points-to sets. For example, alias analysis can be performed by alias analysis module 216 described with respect to FIG. 2 to identify variables that point to the same object and points-to analysis can be performed by alias analysis module 216 described with respect to FIG. 2 to identify the set of objects each variable can point to. Objects referenced by local variables with singleton points-to sets have local variable references that only reference the memory location of that respective object. In embodiments, and as described with respect to FIG. 2, alias analysis module 216 identifies objects referenced by local variables with singleton points-to sets. Those skilled in the art should appreciate that, if an object pointed to by an argument in any given function is reachable from another argument, the system may not perform split-scalarization for those objects. In alternate embodiments, the system can perform whole program alias/points-to analysis to identify such aliases and perform split-scalarization by allocating the stack space accordingly.

At step 308, the system determines fields for objects in functions that are split-scalarizable for fields of the object accessed over a region of a function, where the function refers to the programmed method of step 302. As used herein, a region of a function means a subset of consecutive programming lines within the set of programming lines of the function. For example, an object may be created in a function using a factory method that has fields of the object only accessed within regions of the function such as a loop and other regions of the function where field-access of the object escape the function, for instance, by inter-procedural escape such as returning a variable pointing to the object from the function. For regions of the function where field-access is identified to be associated with a unique thread-local object that does not escape the function and is referenced by local variables with singleton points-to sets, the fields of the object within the regions of the function may be scalarized. For other regions of the function where references to the fields of the object may escape the function, the fields of the object within those other regions of the function may not be scalarized. In embodiments, and as described with respect to FIG. 2, split-scalarization module 220 determines fields for objects in functions that are split-scalarizable for fields of the object accessed over a region of the function.

At step 310, the system performs split-scalarization for scalarizable fields of the object over a region of the function (e.g., the region of the programmed method). For example, scalarization is performed for regions of the function where field-access is identified to be associated with a unique thread-local object that does not escape the function. To preserve semantic functionality in translation of the source code, an instruction is added in embodiments to copy an object field to a scalar before such a region by allocating a local variable on the stack for every field dereference of the object being split-scalarized and replacing the field dereference with the local variable, and another instruction is added to copy the scalar back to the field at the end of the region, if the field may be accessed beyond that point. In embodiments, and as described with respect to FIG. 2, split-scalarization module 220 performs split-scalarization for scalarizable fields of the object over a region of the function.

At step 312, the system outputs optimized code from compilation. In embodiments, and as described with respect to FIG. 2, the compiler module 212 outputs optimized object code 226 from compilation with split-scalarization for fields of an object accessed over a region of a function (e.g., the region of the programmed method). Depending upon the programming language of the source code, the optimized object code 226 may be machine code or native binary code for execution by a CPU or bytecode that is interpreted at run time to produce machine code executed by the CPU. The optimized object code may be saved in persistent storage such as device storage 222.

FIG. 4 shows a flowchart of an exemplary method in accordance with aspects of the present invention. Steps of the method may be carried out in the environment of FIG. 2 and are described with reference to elements depicted in FIG. 2. In particular, the flowchart of FIG. 4 shows an exemplary method for performing split-scalarization of thread-local objects to scalarize some fields of the object accessed over parts of a method or function, in accordance with aspects of the present invention.

At step 402, the system identifies objects in functions of the source code. For example, objects may be identified in embodiments from arguments and allocation statements as member objects of a function. For instance, each allocation statement in a function at line l may be considered to return an object. Non-primitive arguments in a function may also be considered to point to an object. Thus, the system may identify objects in functions from arguments and allocation statements. In embodiments, and as described with respect to FIG. 2, split-scalarization module 220 identifies objects in functions of the source code.

At step 404, the system identifies critical points comprising a start point and a set of endpoints for objects in functions of the source code. For example, each member object $O_x$ of a function has an associated start-point $(O_{x.sp})$, which may be designated by source code line number, that is set to the declaration point (in case of a parameter) or object creation point. Each member object $O_x$ also has an associated set of endpoints $(O_{x.\{ep1, \ldots, epn\}})$. The endpoint of an object is a program point, which may be designated by source code line number, that can be (i) a return statement, or (ii) a function call that takes at least one argument from which $O_x$ is reachable (e.g., via zero or more field dereferences). The union of the start-point and the set of endpoints is defined herein as the critical-points of an object in a function such as member object $O_x$. In this way, critical points comprising a start point and a set of endpoints may be identified in embodiments for objects in functions of the source code. In embodiments, and as described with respect to FIG. 2, split-scalarization module 220 identifies critical points comprising a start point and a set of endpoints for objects in functions of the source code.

At step 406, the system identifies the critical predecessor set for critical point sets of endpoints for objects in functions of the source code. Given any endpoint 1, the critical-point predecessor set (Pred(l)) is defined herein as a maximal set of program points containing elements $\{x_1, x_2, \ldots\}$, such that (i) each such $x_i$ is a critical-point, (ii) for each such $x_i$, there exists at least one path from $x_i$ to l that does not include any other members of Pred(l). Accordingly, the critical predecessor set for critical point sets of endpoints may be identified in embodiments for objects in functions of the source code. In embodiments, and as described with respect to FIG. 2, split-scalarization module 220 identifies the critical predecessor set for critical point sets of endpoints for objects in functions of the source code.

At step 408, the system determines if field accesses in the critical predecessor set are scalarizable for each object. For example, the fields of each object are checked in embodiments to determine if the object is a thread-escaping object, may be pointed to by variables whose points-to set is not a singleton set, or may also be accessed via the fields of any other object. To establish escaping and points-to properties in embodiments, the system performs inter-procedural analysis to identify which procedures can call other procedures, and from which program points the procedure can call other procedures. As part of inter-procedural analysis, a call graph that represents the relationships of the caller function and the called function and a control flow graph that represents the flow of the program between program statements are generated. The system may proceed by processing the endpoints of $O_x$ in a breadth-first-search order of the function control flow graph after removing its back-edges. For each endpoint e, the system evaluates the accesses of the fields of $O_x$ between e and its prior critical-point in embodiments. If the object is a thread-escaping object, may be pointed to by variables whose points-to set is not a singleton set, or may also be accessed via the fields of any other object, then the system determines the field accesses in the critical predecessor set are not scalarizable for each object in embodiments. Otherwise, the system determines the field accesses in the critical predecessor set are scalarizable for each object. In embodiments, and as described with respect to FIG. 2, split-scalarization module 220 determines if field accesses in the critical predecessor set are scalarizable for each object.

At step 410, the system determines that the cost of scalarization for each scalarizable field in the critical predecessor set for objects does not exceed the cost of not scalarizing the field. For instance, the system may determine the cost of the scalarization in embodiments by checking if the cost of accessing the fields of the object between the elements of Pred(e) and e is more than the cost of scalarization. If the field is accessed at least twice between the elements of Pred(e) and e, the cost of scalarization may be determined in embodiments to be less than the cost of not scalarizing the field, and accordingly, the system performs the split-scalarization of the fields accesses between the elements of Pred(e) and e. In embodiments, and as described with respect to FIG. 2, cost analysis module 218 determines that the cost of scalarization for each scalarizable field in the critical predecessor set for objects does not exceed the cost of not scalarizing the field.

At step 412, the system performs split-scalarization for scalarizable fields with scalarization costs that do not exceed the cost of not scalarizing the field. For example, the system performs split-scalarization for scalarizable fields of the fields accesses between the elements of Pred(e) and e as follows: (i) for every field dereference of the object, the system allocates a local variable on the stack (if not already done), and replace the dereference with the local variable, and (ii) if the object may be accessed beyond the endpoint e, the system then copies the changed fields to this object. In performance of step (ii) above, if $O_x$ corresponds to an argument in the current function, the system does not explicitly initialize the nonupdated fields in embodiments. In the case of an object created in the function, the system may only write those fields that are explicitly written to in the function. Moreover, the system does not explicitly remove the allocation statement in embodiments in the case of an object created in the function if the object has all its fields split-scalarized and has none of its fields restored because a post-pass of the compiler can eliminate the allocation statement as dead-code. In embodiments, and as described with respect to FIG. 2, split-scalarization module 220 performs split-scalarization for scalarizable fields with scalarization costs that do not exceed the cost of not scalarizing the field.

In this way, embodiments of the present disclosure may perform split-scalarization by scalarizing access of fields of an object for regions of a function where field-access is identified to be associated with a unique thread-local object that does not escape the function, is referenced by local variables with singleton points-to sets, and is not accessed via the fields of any other object, and leaving the fields of the object unscalarized within other regions of the function where references to the fields of the object may escape the function, are references by local variables with non-singleton points-to sets, or are references via the fields of any other object.

Those skilled in the art should appreciate that further optimizations may be employed in performing split-scalarization of the present disclosure. For example, fields declared as final in objects in an object-oriented language such as Java™ may include additional optimization during split-scalarization. Although fields declared as final are typically assumed to be immutable (i.e., cannot be written to once instantiated), the feature of the Java™ language, for instance, to modify the access modifiers (using Field.setAccessible method) may allow access permission to be modified. In this situation, the system may establish that the fields of an object declared as final will not have their access permissions modified, for instance, by checking the setAccessible method is not invoked or via reflection, and the system may perform split-scalarize of fields declared as final by loading them once to a temporary variable at the beginning of the method and by replacing each load by the temporary variable. These fields need not be restored at any endpoint as they are immutable.

In embodiments, a service provider could offer to perform the processes described herein. In this case, the service provider can create, maintain, deploy, support, etc., the computer infrastructure that performs the process steps described herein for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes described herein can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer-readable medium; (2) adding one or more computing devices to the computer infrastructure; and (3) incorporating and/or modifying one or more existing systems of the computer infrastructure to enable the computer infrastructure to perform the processes described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a processor set, source code including at least one programmed method and at least one reference within the at least one programmed method that accesses at least one field of at least one object;
   determining, by the processor set, that the at least one object is local to a thread without reference to the at least one object outside the thread and that the at least one field of the at least one object is scalarizable over a region of the at least one programmed method;
   performing, by the processor set, scalarization of the at least one field of the at least one object over the region of the at least one programmed method; and
   outputting, by the processor set, optimized object code with the at least one field of the at least one object scalarized over the region of the at least one programmed method and with another field of the at least one object unscalarized in a different region of the at least one programmed method.

2. The computer-implemented method of claim 1, further comprising identifying that the at least one object is a thread-local object.

3. The computer-implemented method of claim 2, wherein the identifying comprises performing inter-procedural analysis of the at least one programmed method.

4. The computer-implemented method of claim 1, further comprising identifying that the at least one object is referenced by local variables with singleton points-to sets.

5. The computer-implemented method of claim 4, wherein the identifying comprises performing points-to analysis that identifies a set of objects the local variables can point to.

6. The computer-implemented method of claim 1, wherein the determining comprises determining that the at least one object is not accessed via a field of another object.

7. The computer-implemented method of claim 1, further comprising determining that the another field of the at least one object is not scalarizable in the different region of the at least one programmed method.

8. The computer-implemented method of claim 1, further comprising determining that a cost of scalarizing the at least one field of the at least one object does not exceed a cost of not scalarizing the at least one field.

9. The computer-implemented method of claim 8, wherein the determining comprises determining that the at least one field is accessed at least twice.

10. The computer-implemented method of claim 1, further comprising determining that a cost of scalarizing the another field of the at least one object exceeds a cost of not scalarizing the another field.

11. The computer-implemented method of claim 1, wherein the determining comprises identifying critical points comprising a start-point and a set of endpoints for the at least one object within the at least one programmed method.

12. The computer-implemented method of claim 11, wherein the identifying comprises identifying a critical predecessor set for the set of endpoints of the critical points.

13. A computer program product comprising one or more computer readable storage media having program instructions collectively stored on the one or more computer readable storage media, the program instructions executable to:
   receive source code including at least one programmed method and at least one reference within the at least one programmed method that accesses at least one field of at least one object;
   identify critical points comprising a start-point and a set of endpoints for the at least one object within the at least one programmed method;
   identify a critical predecessor set for the set of endpoints of the critical points of the at least one object within the at least one programmed method;
   determine that the at least one object is local to a thread without reference to the at least one object outside the thread and that at least one field access of the at least one object in the critical predecessor set of the at least one programmed method is scalarizable;
   perform scalarization of the at least one field access of the at least one object in the critical predecessor set of the at least one programmed method; and
   output optimized object code with the at least one field access of the at least one object scalarized in the critical predecessor set of the at least one programmed method and with another field access of the at least one object not scalarized in the at least one programmed method that is not in the critical predecessor set in the at least one programmed method.

14. The computer program product of claim 13, wherein the program instructions are further executable to determine that a cost of scalarizing the at least one field access of the at least one object in the critical predecessor set of the at least one programmed method does not exceed a cost of not scalarizing the at least one field access.

15. The computer program product of claim 13, wherein the determining comprises determining that the another field access of the at least one object not in the critical predecessor set is not scalarizable.

16. The computer program product of claim 13, wherein the determining comprises:

determining the another field access is not thread-escaping;

determining the another field access is not referenced by local variables with non-singleton points-to sets; and determining the another field access is not accessed via a field of another object.

17. A system comprising:

a processor set, a computer readable memory, one or more computer readable storage media, and program instructions collectively stored on the one or more computer readable storage media, the program instructions executable to:

receive source code including at least one programmed method and at least one reference within the at least one programmed method that accesses at least one field of at least one object;

determine that the at least one object is local to a thread without reference to the at least one object outside the thread and that the at least one field of the at least one object is scalarizable over a region of the at least one programmed method;

determine that a cost of scalarizing the at least one field of the at least one object does not exceed a cost of not scalarizing the at least one field;

perform scalarization of the at least one field of the at least one object over the region of the at least one programmed method; and output optimized object code with the at least one field of the at least one object scalarized over the region of the at least one programmed method and with another field of the at least one object unscalarized in a different region of the at least one programmed method.

18. The system of claim 17, wherein the program instructions are further executable to identify that the another field of the at least one object is a thread-escaping.

19. The system of claim 17, wherein the program instructions are further executable to identify that the another field of the at least one object is referenced by local variables with non-singleton points-to sets.

20. The system of claim 17, wherein the program instructions are further executable to identify that the another field of the at least one object is accessed via a field of another object.

\* \* \* \* \*